United States Patent [19]

Izumida et al.

[11] Patent Number: 5,034,447

[45] Date of Patent: Jul. 23, 1991

[54] SLIDING RESIN COMPOSITION

[75] Inventors: Toshiaki Izumida, Kanagawa; Koujiro Matsuo; Jun Yagi, both of Osaka; Sangoro Ichii; Naoto Obayashi, both of Kanagawa, all of Japan

[73] Assignees: Mitsubishi Gas Chemical Co., Inc., Tokyo; Matsushita Electric Industrial Co., Ltd., Osaka, both of Japan

[21] Appl. No.: 614,480

[22] Filed: Nov. 16, 1990

[30] Foreign Application Priority Data

Nov. 21, 1989 [JP] Japan .................................. 1-300833

[51] Int. Cl.$^5$ .......................... C08K 3/22; C08K 3/40; C08K 3/04
[52] U.S. Cl. ................................... 524/432; 524/494; 524/495
[58] Field of Search ....................... 524/432, 494, 495

[56] References Cited

U.S. PATENT DOCUMENTS

| | | | |
|---|---|---|---|
| 4,097,435 | 6/1978 | Rawlings et al. | 524/277 |
| 4,687,802 | 8/1987 | Hepp | 524/411 |
| 4,960,654 | 10/1990 | Yoshinaka et al. | 428/614 |

FOREIGN PATENT DOCUMENTS

| | | | |
|---|---|---|---|
| 0000845 | 1/1977 | Japan | 524/494 |
| 0027947 | 2/1984 | Japan | 524/495 |
| 1203460 | 8/1989 | Japan | 524/494 |
| 2020552 | 1/1990 | Japan | 524/494 |

Primary Examiner—Paul R. Michl
Assistant Examiner—Peter Szekely
Attorney, Agent, or Firm—Sughrue, Mion, Zinn, Macpeak & Seas

[57] ABSTRACT

A sliding resin composition comprising an aromatic polycarbonate resin composition (A) and zinc oxide whiskers (B) in an amount of from 1 to 40% by weight based on the total weight of the sliding resin composition. The sliding resin composition is suitably used in fields where a sliding property is required, such as a lens frame (lens tube) for cameras, gears and cams for OA machines and apparatus, etc.

4 Claims, No Drawings

SLIDING RESIN COMPOSITION

FIELD OF THE INVENTION

The present invention relates to an aromatic polycarbonate resin composition to which zinc oxide whiskers have been added, having a sliding property, which is suitably used in fields where the sliding property is required, such as a lens frame (lens tube) for cameras, gears and cams for OA machines and apparatus, etc.

BACKGROUND OF THE INVENTION

Exchangeable lenses for cameras are fitted to the cameras by screwing the lens tubes which are cylindrical molded products of various kinds into the cameras. These lens tubes are produced from molding materials reinforced with glass fibers or the like. However, such a glass fiber-reinforced molded product has a disadvantage that glass fibers exposed on the product surface impair the smoothness and sliding property of the product. On the other hand, moving parts such as gears, cams, etc., for OA machines and apparatus have conventionally been manufactured by molding aromatic polycarbonate resin compositions containing a lubricating filler and/or a slip agent, such as a fluoroplastic, molybdenum disulfide, silicone oil, etc. However, such moving parts are defective in that, for example, a gear having tooth tops of 1.0 mm or less has poor fatigue resistance and, hence, has a short life.

It has been proposed to conduct molding at higher mold temperatures in order to prevent glass fibers from being exposed on the surface of the molded product. This technique, however, newly causes problems in that it is necessary to use a longer cooling time, resulting in an elongated molding cycle, and that mold-release properties are impaired. It has also been proposed to use reinforcements such as potassium titanate whiskers and asbestos, which are finer than glass fibers, from the standpoint that in producing a gear or other parts by molding a glass fiber-reinforced material, glass fibers tend not to be present in the end portions of the thin teeth of the molded gear, etc., so that the thin teeth have insufficient fatigue resistance. However, the above-proposed reinforcements decompose and deteriorate aromatic polycarbonate resins to rather impair the properties of the molded products.

Some of the present inventors previously succeeded to produce, on an industrial scale, zinc oxide whiskers, each comprising a core and four acicular-crystal arms extending from the core in different directions, the acicular-crystal arms each having a diameter as measured at the root thereof of from 0.7 to 14 $\mu$m and a length as measured from the root to the end thereof of from 3 to 200 $\mu$m, by a novel process as described in JP-A-62-334418 and JP-A-63-41330. (The term "JP-A" as used herein means an "unexamined published Japanese patent application".)

SUMMARY OF THE INVENTION

As a result of intensive studies to overcome the disadvantages of aromatic polycarbonate resin compositions reinforced with glass fibers, etc., it has now been found that by using the above-described zinc oxide whiskers to reinforce an aromatic polycarbonate, a novel and useful composition can be obtained which not only shows improved strength without suffering substantial deterioration of the aromatic polycarbonate but possesses an improved sliding property. The present invention has been completed based on this finding.

Accordingly, an object of the present invention is to provide a sliding resin composition which is suitably used in fields where a sliding property is required.

The sliding resin composition in accordance with the present invention comprises an aromatic polycarbonate resin composition (A) and zinc oxide whiskers (B) in an amount of from 1 to 40% by weight based on the total weight of the sliding resin composition.

In one preferred embodiment of the present invention, the zinc oxide whiskers (B) each is roughly in a tetrapod form comprising a core and four acicular-crystal arms extending from the core in different directions, the acicular-crystal arms each having a diameter as measured at the root thereof of from 0.7 to 14 $\mu$m and a length as measured from the root to the end thereof of from 3 to 200 $\mu$m.

In another preferred embodiment, the aromatic polycarbonate resin composition contains an inorganic or organic reinforcement which is preferably glass fibers or carbon fibers.

DETAILED DESCRIPTION OF THE INVENTION

The aromatic polycarbonate resin composition (A) contained in the composition of the present invention is either an aromatic polycarbonate alone or an aromatic polycarbonate-based resin composition comprising the aromatic polycarbonate having added thereto a thermoplastic resin, elastomer, reinforcement, filler, etc.

The aromatic polycarbonate which is used in the present invention can be prepared by the same method as used to produce conventional polycarbonate resins, that is, the reaction of an aromatic dihydric phenol-type compound with phosgene or a carbonic acid diester. The aromatic polycarbonate which can be a homo- or copolymer used to produce the composition of the present invention has preferably a viscosity-average molecular weight in the range of from 19,000 to 30,000.

Examples of the aromatic dihydric phenol-type compound include 2,2-bis(4-hydroxyphenyl)propane, 2,2-bis(4-hydroxy-3,5-dimethylphenyl)propane, bis(4-hydroxyphenyl)methane, 1,1-bis(4-hydroxyphenyl)ethane, 2,2-bis(4-hydroxyphenyl)butane, 2,2-bis(4-hydroxy-3,5-diethylphenyl)propane, 2,2-bis(4-hydroxy-3,5-dipropylphenyl)propane, 1,1-bis(4-hydroxyphenyl)-cyclohexane, and 1-phenyl-1,1-bis(4-hydroxyphenyl)ethane. Those may be suitably used alone or as a mixture of two or more thereof.

A molecular weight regulator may be used in the reaction of the aromatic dihydric phenol-type compound with phosgene or a carbonic acid diester to produce the aromatic polycarbonate, and conventional monohydric phenol-type compounds can be used. Examples thereof include phenol; p-t-butylphenol; tribromophenol; long chain alkyl-substituted phenols such as octylphenol, nonylphenol, and laurylphenol; long chain alkyl esters of hydroxybenzoic acid such as octyl hydroxybenzoate, lauryl hydroxybenzoate, and nonyl hydroxybenzoate; and (long chain alkyl)oxy-phenols such as octyl ether phenol (i.e., octyloxyphenol), nonyl ether phenol, and lauryl ether phenol. The amount of the molecular weight regulator used is from 1 to 10 mol %, preferably from 2.0 to 3.5 mol %, per mole of the dihydric phenol-type compound used.

The aromatic polycarbonate can have a branched structure. Examples of a branching agent which can be used in the reaction of the dihydric phenol-type compound to produce a branched polycarbonate include polyhydroxy compounds such as phloroglucinol, 2,6-dimethyl-2,4,6-tri(4-hydroxyphenyl)heptene-3, 4,6-dimethyl-2,4,6-tri(4-hydroxyphenyl)heptene-2, 1,3,5-tri(2-hydroxyphenyl)benzene, 1,1,1-tri(4-hydroxyphenyl)ethane, 2,6-bis(2-hydroxy-5-methylbenzyl)-4-methylphenol, and α,α',α"-tri(4-hydroxyphenyl)-1,3,5-triisopropylbenzene, and further include 3,3-bis(4-hydroxyaryl)oxyindole (i.e., isatin bisphenol), 5-chloroisatin, 5,7-dichloroisatin, and 5-bromoisatin. The amount of the branching agent used is from 0.02 to 1.0 mol % per mole of the dihydric phenol-type compound used.

It is preferred that the zinc oxide whiskers (B) added to the composition of the present invention are such that each whisker is roughly in a tetrapod form comprising a core and four acicular-crystal arms extending from the core in different directions, the acicular-crystal arms each having a diameter as measured at the root thereof of from 0.7 to 14 μm and a length as measured from the root to the end thereof of from 3 to 200 μm.

The amount of the zinc oxide whiskers added to the composition of the present invention is from 1 to 40% by weight, preferably from 5 to 35% by weight, based on the total weight of the sliding resin composition. If the amount of the zinc oxide whiskers added is below 1% by weight, the effect of improving sliding property is insufficient. On the other hand, even if the whiskers are added in an amount exceeding 40% by weight, no further improvement in the sliding property can be expected.

The composition of the present invention contains the above-described two ingredients as essential components, but if required and necessary, can further contain other ingredients such as thermoplastic resins other than aromatic polycarbonate resins, various kinds of elastomers, reinforcements, additives, etc.

Examples of the thermoplastic resins include crystalline thermoplastic polyester resins such as PET and PBT; liquid-crystal polyester resins such as copolymers of all-aromatic polyesters with polyesters having aliphatic chains; styrene-based resins such as PS, HIPS, AS, MS, ABS, MBS, EPDM-SAN, AES, AAS, and MAS; acrylic resins such as PMMA; polyamide resins such as nylon-6, nylon-12, and MXD6; polyolefin resins such as PE and PP; and poly(phenylene ether)s, polysulfones, polyethersulfones, and other various kinds of engineering plastics. These thermoplastic resins can be used alone or in combination of two or more thereof.

Examples of the elastomers include thermoplastic elastomers such as polyester elastomers, polyamide elastomers, styrene-butadiene-styrene block copolymer elastomers, hydrogenated styrene-butadiene-styrene block copolymer elastomers, alkyl acrylate copolymer rubbers, alkyl methacrylate copolymer rubbers, ethylene-propylene copolymer rubbers, ethylene-propylene-diene copolymer rubbers, and the like; a particulate elastomer in which the particles each has a core-shell structure comprising a core made of polybutadiene, an acrylic rubber, or the like and a glassy resin grafted onto the core surface; particulate elastomers of other multilayer structures; and so-called "gel rubbers" having a multi-cellular structure. These are suitably used to improve impact resistance and compatibility.

Examples of the reinforcements include glass fibers, glass beads, carbon fibers, all-aromatic polyamide fibers, metal fibers, and others.

In the present invention, conventional flame retardants, mold-release agents, lubricants, stabilizers, dyes and pigments, light stabilizers, antistatic agents, and other additives including agents for imparting a sliding property can further be appropriately added to the polycarbonate resin.

Exemplary flame retardants include aromatic halide-type flame retardants such as a halogenated polycarbonate derived from tetrabromobisphenol A, an oligomer thereof, poly(dibromophenylene oxide), bis(pentabromophenoxy)ethane, brominated polystyrene, tetrabromobisphenol S, and ethylenebis(tetrabromophthalimide); brominated organophosphorus compound-type flame retardants such as triphenylphosphonium bromide and triphenyl-n-butylphosphonium bromide; and auxiliary flame retardants such as antimony compounds including antimony trioxide, antimony tetraoxide, and antimony pentoxide.

The sliding resin composition of the present invention is prepared from the essential ingredients (A) and (B), and if necessary, other ingredients described above. The preparation method is not particularly limited, and a conventional method for industrial preparation can suitably be used. For example, the following method can be employed: a method in which ingredients (A) and (B) and other suitable additives are sufficiently mixed with each other by a mixing means such as a V-blender, and the resulting mixture is then formed into pellets with a single-screw vented extruder; or a method in which ingredient (A) is mixed beforehand with other suitable additives by a powerful mixing means such as a super mixer, and the resulting mixture is then subjected to extrusion with a twin-screw vented extruder while ingredient (B) and other fibrous reinforcement(s) are being fed from the middle of the extruder, whereby the ingredients are mixed and formed into pellets.

The present invention will be explained in more detail by reference to the following Examples and Comparative Examples, which should not be construed to be limiting the scope of the invention. In these examples, all parts are by weight unless otherwise indicated.

EXAMPLES 1 TO 5 AND COMPARATIVE EXAMPLES 1 AND 2

A polycarbonate resin ("Iupilon S-2000", manufactured by Mitsubishi Gas Chemical Company, Inc., Japan; hereinafter referred to as "PC"), zinc oxide whiskers ("Panatetra", manufactured by Matsushita Sangyo Kiki Co., Ltd., Japan; hereinafter referred to as "ZnO whisker"), and as other reinforcements, glass fibers ("CS03MA409C", manufactured by Asahi Fiber Glass Co., Ltd., Japan; length 3 mm; hereinafter referred to as "GF") and carbon fibers ("Besfite HTA-C6-SRS-GF", manufactured by Toho Rayon Co., Ltd., Japan; hereinafter referred to as "CF") were mixed according to the formulations shown in the Table below. Each of the resulting mixtures was agitated with a tumbler and then extruded at 230°–250° C. into pellets by means of a 40 mm diameter single-screw vented extruder.

The pellets thus obtained were dried in a circulating hot air oven at 120° C. for 4 hours and then formed into test pieces for sliding property evaluation and test pieces for measurements of other various properties.

The thus-obtained molded test pieces were evaluated for various properties, and the results obtained are shown in the Table below.

Frictional property was evaluated as follows.

The pellets were formed into disks having a thickness of 3.2 mm and an outer diameter of 100 mm by means of injection molding machine 140B manufactured by Meiki Co., Ltd., Japan, and small disks were cut out from the above disks and used as test pieces. Cylindrical steel pieces were cut out with a lathe from a round S50C carbon steel piece which was selected as the material with which the disk test pieces were rubbed. Frictional property was evaluated by rubbing the disk test pieces and the cylindrical steel pieces with each other using a thrust testing machine manufactured by Toyo Seiki Seisaku-Sho, Ltd., Japan.

Limiting PV value (unit: kg/cm sec) was determined in a thrust test which was conducted at a constant circumferential velocity (V=60 cm/sec) while increasing the load, by measuring the limiting value at the time when the resin sample was melted and broken by frictional heat resulting from increased frictional resistance. The larger the limiting PV value, the better the frictional resistance.

On the other hand, dynamic coefficient of friction $\mu$ was determined as follows.

Frictional resistance was measured with a torque meter in a sliding test conducted at a constant circumferential velocity (V=30 cm/sec) and at a constant load, and then the dynamic coefficient of friction was calculated using the following equation:

$$\mu = T/(W \cdot R)$$

wherein T: torque, W: load (10 kg), R: average diameter of the rings (1.14 cm). The smaller the coefficient value, the better the frictional resistance.

Other various properties were evaluated according to the following methods.

| (Abbreviation) | Property | (Unit) | (Measuring method) |
|---|---|---|---|
| $M_W$ | Viscosity-average molecular weight | — | — |
| $\sigma_T$ | Tensile strength, without weld mark | (kg/cm$^2$) | ASTM-D 638 |
| $\sigma_{TW}$ | Tensile strength, with weld mark | (") | " |
| $\epsilon$ | Tensile elongation, without weld mark | (%) | " |
| $Y_T$ | Tensile modulus, without weld mark | ($\times 10^3$ kg/cm$^2$) | " |
| $\sigma_F$ | Flexural strength | (kg/cm$^2$) | ASTM-D 790 |
| $Y_F$ | Flexural modulus | ($\times 10^3$ kg/cm$^2$) | " |
| IZ | Notched Izod impact strength | (kg cm/cm) | ASTM-D 256 |
| HDT | Heat distortion temperature HDT-L: 4.6 kg/cm$^2$ load HDT-H: 18.6 kg/cm$^2$ load | (°C.) | ASTM-D 648 |
| S | Molding shrinkage factor | (%) | original method*$^1$ |

*$^1$Using a disk having a diameter of 100 mm and a thickness of 3.2 mm, a molded disk is measured in two directions, i.e., the directions parallel to and perpendicular to the resin flow from the gate, and the molding shrinkage factor for each direction is calculated from the measured diameter value and the dimensions of the mold cavity.

TABLE 1

| | Comp. Exp. 1 | Exp. 1 | Exp. 2 | Exp. 3 | Comp. Exp. 2 | Exp. 4 | Exp. 5 |
|---|---|---|---|---|---|---|---|
| Formulation (parts) | | | | | | | |
| PC | 100 | 90 | 80 | 70 | 80 | 70 | 65 |
| Z$_n$O | | 10 | 20 | 30 | | 10 | 10 |
| GF | | | | | 10 | 10 | 10 |
| CF | | | | | 10 | 10 | 15 |
| $M_W$ ($\times 10^4$) | 2.0 | 2.2 | 2.0 | 2.1 | 2.0 | 2.0 | 1.9 |
| $\mu$ | *$^1$ | 0.39 | 0.43 | 0.40 | *$^1$ | 0.41 | 0.33 |
| Limiting PV value | *$^2$ | 300 | 300 | 300 | *$^2$ | 300 | 300 |
| $\sigma_T$ | 620 | 605 | 600 | 650 | 1320 | 1350 | 1533 |
| $\sigma_{TW}$ | 500 | 590 | 550 | 483 | 510 | 512 | 490 |
| $\epsilon$ | 100 | 89 | 33 | 5 | 3 | 1 | 1 |
| $Y_T$ | 23.0 | 27.3 | 32.7 | 46.0 | 132 | 135 | 156 |
| Retention of weld strength*$^3$ (%) | 81 | 98 | 92 | 74 | 39 | 38 | 32 |
| $\sigma_F$ | 850 | 958 | 951 | 1038 | 1802 | 1829 | 2010 |
| $Y_F$ | 23.0 | 29.9 | 36.4 | 48.7 | 108 | 109 | 146 |
| IZ | 90 | | 12 | 10 | 11 | 11 | 99 |
| HDT | | | | | | | |
| -L | 139 | 139 | 137 | 139 | 148 | 143 | 142 |
| -H | 133 | 130 | 129 | 133 | 143 | 139 | 137 |
| S: | | | | | | | |
| Parallel | 0.65 | 0.42 | 0.42 | 0.35 | 0.01 | 0.09 | 0.09 |
| Perpendicular | 0.70 | 0.43 | 0.38 | 0.33 | 0.30 | 0.21 | 0.18 |

Note
*$^1$The value was too large to measure.
*$^2$the value was too small to measure.
*$^3 \sigma_{TW}/\sigma_T \times 100$ (%)

As is explained hereinbefore and particularly as shown in the Examples and Comparative Examples, the composition having added thereto zinc oxide whiskers having a specific structure, in accordance with the present invention, shows excellent frictional resistance, and hence, can be used, for example, as moving parts that move while contacting with other substances. Further, in the case where the composition of the present invention contains no reinforcements other than the zinc oxide whiskers, the zinc oxide whisker reinforcement never undergoes orientation during molding of the composition, as can be seen from the molding shrinkage factors. On the contrary, the coefficients of friction of the compositions of Comparative Examples were too high to measure and, hence, such compositions cannot be used as moving parts.

Thus, the frictional resistance is imparted to the composition of the present invention by the inorganic filler only, and even in the case where the inorganic filler is used in combination with other reinforcement, the frictional resistance is not impaired but maintained or further improved. Furthermore, deterioration (molecular weight decrease) of the polycarbonate by the zinc oxide whiskers is extremely slight. From the above, it can be understood that the composition of the present invention is advantageously used as a sliding material for various usages after being suitably reinforced with fibers, if necessary.

While the invention has been described in detail and with reference to specific embodiments thereof, it will be apparent to one skilled in the art that various changes and modifications can be made therein without departing from the spirit and scope thereof.

What is claimed is:

1. A sliding resin composition comprising an aromatic polycarbonate resin composition (A) and zinc oxide whiskers (B) in an amount of from 1 to 40% by weight based on the total weight of the sliding resin composition.

2. A sliding resin composition as claimed in claim 1, wherein said zinc oxide whiskers (B) each is roughly in a tetrapod form comprising a core and four acicular-crystal arms extending from the core in different directions, said acicular-crystal arms each having a diameter as measured at the root thereof of from 0.7 to 14 $\mu$m and a length as measured from the root to the end thereof of from 3 to 200 $\mu$m.

3. A sliding resin composition as claimed in claim 1, wherein said aromatic polycarbonate resin composition contains an inorganic or organic reinforcement.

4. A sliding resin composition as claimed in claim 3, wherein said reinforcement is glass fibers or carbon fibers.

* * * * *